(12) United States Patent
Makino

(10) Patent No.: US 8,920,545 B2
(45) Date of Patent: Dec. 30, 2014

(54) FUEL VAPOR PROCESSING APPARATUS

(75) Inventor: Katsuhiko Makino, Obu (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 169 days.

(21) Appl. No.: 13/603,737

(22) Filed: Sep. 5, 2012

(65) Prior Publication Data

US 2013/0055899 A1    Mar. 7, 2013

(30) Foreign Application Priority Data

Sep. 5, 2011    (JP) ................. 2011-192395

(51) Int. Cl.
  *F02M 25/08*    (2006.01)
  *B01D 53/04*    (2006.01)

(52) U.S. Cl.
  CPC .............. *B01D 53/04* (2013.01); *F02M 25/089* (2013.01); *F02M 2025/0881* (2013.01); *B01D 2259/4009* (2013.01); *B01D 2259/4516* (2013.01); *F02M 2025/0845* (2013.01); *B01D 2253/102* (2013.01); *B01D 53/0415* (2013.01)
  USPC ................. 96/112; 96/115; 96/126; 96/146

(58) Field of Classification Search
  USPC ................... 96/112, 115, 121, 126, 146, 147; 95/146; 123/519
  See application file for complete search history.

(56) References Cited

U.S. PATENT DOCUMENTS

| | | | |
|---|---|---|---|
| 6,279,548 B1* | 8/2001 | Reddy ........................... | 123/520 |
| 6,689,196 B2* | 2/2004 | Amano et al. .................. | 96/112 |
| 6,701,902 B2* | 3/2004 | Koyama et al. ................ | 123/519 |
| 7,323,041 B2* | 1/2008 | Yoshida et al. ................ | 96/132 |
| 8,273,164 B2* | 9/2012 | Makino et al. ................. | 96/134 |
| 8,617,299 B2* | 12/2013 | Hasegawa et al. ............. | 96/121 |
| 2005/0247202 A1* | 11/2005 | Seki ................................ | 96/146 |
| 2010/0147152 A1* | 6/2010 | Kosugi ........................... | 96/146 |
| 2012/0186563 A1* | 7/2012 | Hasegawa et al. ............ | 123/519 |
| 2013/0025460 A1* | 1/2013 | Yamanaka ..................... | 96/144 |

FOREIGN PATENT DOCUMENTS

| | | |
|---|---|---|
| JP | 59-181264 | 12/1984 |
| JP | 63-150459 | 6/1988 |
| JP | 2008-038688 | 2/2008 |

\* cited by examiner

*Primary Examiner* — Frank Lawrence

(74) *Attorney, Agent, or Firm* — Lada & Parry LLP

(57) ABSTRACT

A fuel vapor processing apparatus may include a latent heat storage material that releases latent heat during desorption of fuel vapor from an adsorption material.

12 Claims, 7 Drawing Sheets

FUEL VAPOR PROCESSING APPARATUS

This application claims priority to Japanese patent application serial number 2011-192395, the contents of which are incorporated herein by reference.

BACKGROUND OF THE INVENTION

1. Field of the Invention

Embodiments of the present invention relate to fuel vapor processing apparatus used mainly for vehicles, such as automobiles, for adsorbing by an adsorption material fuel vapor produced in a fuel tank and purging fuel vapor desorbed from the adsorption material into an internal combustion engine.

2. Description of the Related Art

Fuel vapor processing apparatus generally include an adsorption material (e.g., activated carbon) filled into a case for adsorbing fuel vapor and allowing desorption of fuel vapor. Fuel vapor may be introduced into the case so as to be adsorbed by the adsorption material. Fuel vapor adsorbed by the adsorption material may be desorbed by a flow of air flowing through the case and then may be purged into the engine, more specifically, an intake air passage of the engine. JP-A-63-150459 teaches a fuel vapor processing apparatus having a heater for heating an adsorption material, so that the adsorption material may be heated by the heater during desorption in order to improve the desorption efficiency of fuel vapor.

In the case of the fuel vapor processing apparatus disclosed in JP-A-63-150459, the heater is operated (or electrically energized) after a residual amount of fuel vapor adsorbed by the adsorption material has been reduced to a predetermined value. Therefore, during the time when the heater is not operated (or not electrically energized), the temperature of the adsorption material may be lowered due to vaporization latent heat of fuel vapor, resulting in lowering the desorption efficiency. For this reason, there has been a problem that the time required for the desorption process becomes longer. If the time for operation of the heater is lengthened in order to this problem, it may cause increase in power consumption (energy consumption).

Therefore, there has been a need in the art for minimizing the time necessary for a desorption process of a fuel vapor processing apparatus and for reducing the power consumption of the heater.

SUMMARY OF THE INVENTION

In one aspect according to the present teachings, a fuel vapor processing apparatus may include a latent heat storage material that releases latent heat during desorption of fuel vapor from an adsorption material.

DETAILED DESCRIPTION OF THE INVENTION

Figure 1:
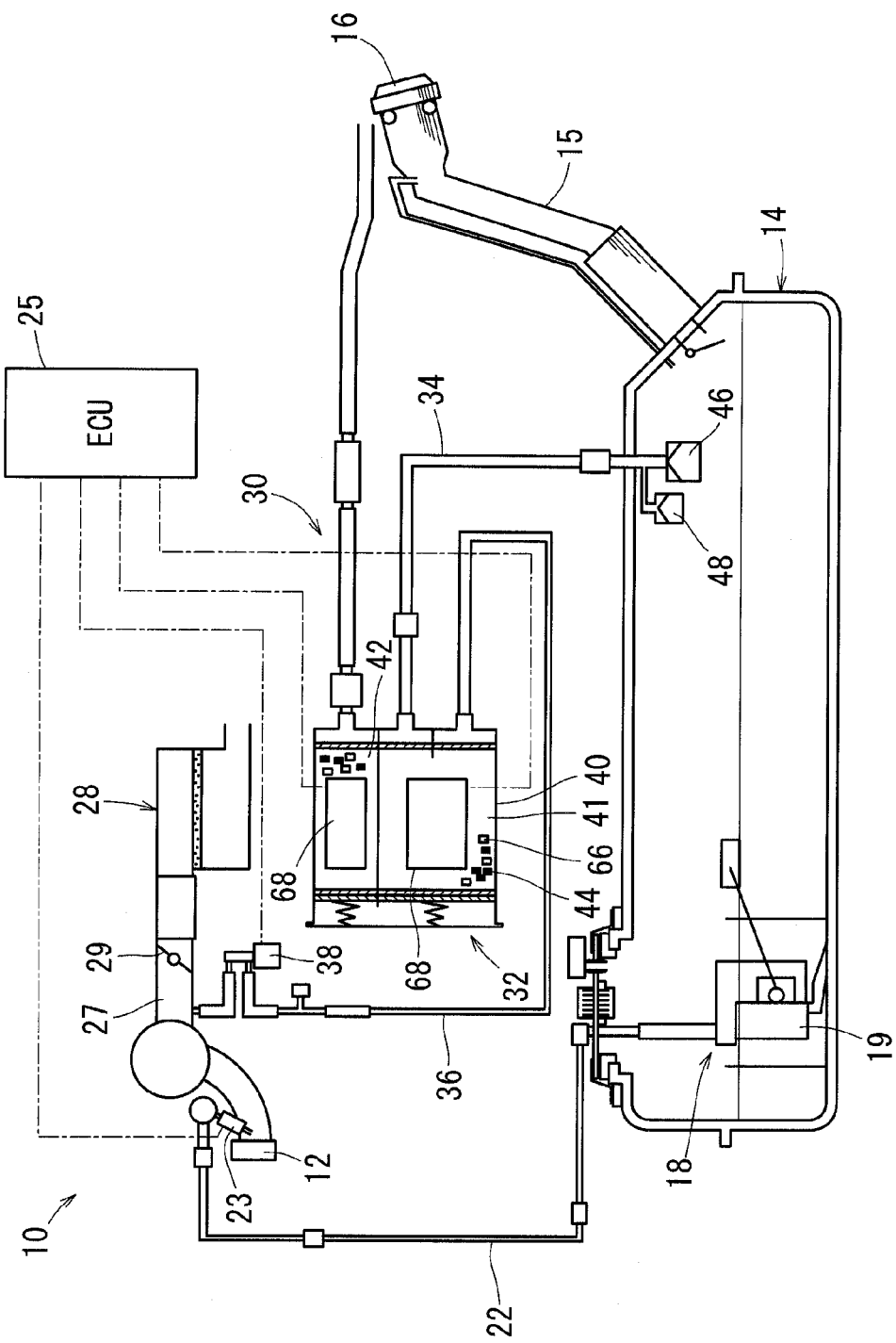
FIG. 1 is a schematic view of a vehicle engine system incorporating a fuel vapor processing apparatus according to a first embodiment.

Each of the additional features and teachings disclosed above and below may be utilized separately or in conjunction with other features and teachings to provide improved fuel vapor processing apparatus and vehicle engine system incorporating such fuel vapor processing apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, a fuel vapor processing apparatus may include a case and an adsorption material located within the case. The adsorption material can adsorb fuel vapor introduced in the case and fuel vapor adsorbed by the adsorption material can be desorbed from the adsorption material so as to be purged into an engine by air flowing through the case. The fuel vapor processing apparatus may further include a heater configured to heat the adsorption material and a latent heat storage material that releases latent heat for inhibiting change of temperature of the adsorption material.

With this arrangement, during the desorption process, the heater may heat the adsorption material, so that the desorption efficiency can be improved. When the heat is not operated to heat the adsorption material, the latent heat storage material may release latent heat to inhibit decrease in temperature of the adsorption material due to evaporation latent heat of fuel vapor, so that the desorption efficiency can still be improved. In this way, it is possible to minimize the time required for the desorption process, and additionally it is possible to reduce energy consumption of the heater.

The fuel vapor processing apparatus may further include a heat control device configured to operate the heater after the latent heat storage material starts to release latent heat.

The heater may include a heat generation element capable of generating heat when electrically energized, and the heat generation element may be a film formed by curing a heat generation ink that contains the latent heat generation material. In this way, the latent heat storing material can be easily integrally held by the heat generation element. In addition, the film of the heat generation element can be easily formed by a printing or coating technique.

(First Embodiment)

A first embodiment will be described in connection with a fuel vapor processing apparatus that may be mounted to a vehicle, such as an automobile. For the convenience of explanation, an engine system of the vehicle will be first described before describing the fuel vapor processing apparatus. Referring to FIG. 1, the vehicle engine system generally includes an engine (internal combustion engine) 12 and a fuel tank 14. The engine 12 may be a gasoline engine. An inlet pipe 15 is connected to the fuel tank 14 for filling fuel into the fuel tank 14. A cap 16 may be detachably mounted to a fuel inlet located at an upper end of the inlet pipe 15.

A fuel supply device 18 may be disposed within the fuel tank 14 and may include a fuel pump 19. The fuel within the fuel tank 14 may be pumped and pressurized by the operation of the fuel pump 19 and may then be supplied to injectors 23 of the engine 12 via a fuel supply passage 22. The injectors 23 may be provided in correspondence with cylinders of the engine 12, so that fuel may be injected into the engine cylinders via the corresponding intake ports of the engine 12. The operations of the injectors 23 may be controlled by an electronic control unit (hereinafter called "ECU") 25, so that injection of fuel from each injector 23 may be controlled by the ECU 25. In FIG. 1, reference numerals 27, 28 and 29 designate an intake air passage, an air cleaner and a throttle valve, respectively, of the engine 12.

A fuel vapor processing system 30 may be incorporated into the engine system 10 and may include a fuel vapor processing apparatus 32, a fuel vapor passage 34, a purge passage 36 and a purge valve 38. The fuel vapor processing apparatus 32 may be called as a canister and may include a case 40 and activated carbon 44 filled therein. The activated carbon 44 may adsorb fuel vapor and may allow desorption of fuel vapor from the activated carbon 44. More specifically, the activated carbon 44 may adsorb fuel vapor introduced into the case 40 and may allow desorption of adsorbed fuel vapor by air that may flow through the case 40. The desorbed fuel vapor may be purged into the engine 12 (more specifically, the intake air passage 27 of the engine 12). The details of the fuel vapor processing apparatus 32 will be explained later.

A space occupied by gas (called "gaseous space) within the fuel tank 14 and inside of the case 40 of the fuel vapor processing apparatus 32 may communicate with each other via the fuel vapor passage 34. The purge passage 36 may communicate between inside of the case 40 of the fuel vapor processing apparatus 32 and the intake air passage 27 (more specifically, a part of the intake air passage 27 on the downstream side of the throttle valve 29). The purge valve 38 may be a solenoid valve and may be provided in the purge passage 36. The ECU 25 may control the operation of the purge valve 38. A rollover valve 46 and a cut-off valve 48 may be connected to the end portion of the fuel vapor passage 34 on the side of the fuel tank 14. The operation of the fuel vapor processing system 30 will be explained later.

The fuel vapor processing apparatus 32 will now be described. The fuel vapor processing apparatus 32 is schematically shown in cross section in FIG. 2. For the purpose of explanation, the upper side, lower side, left side and right side of the fuel vapor processing apparatus 32 will be determined with reference to the position shown in FIG. 2.

Figure 2:
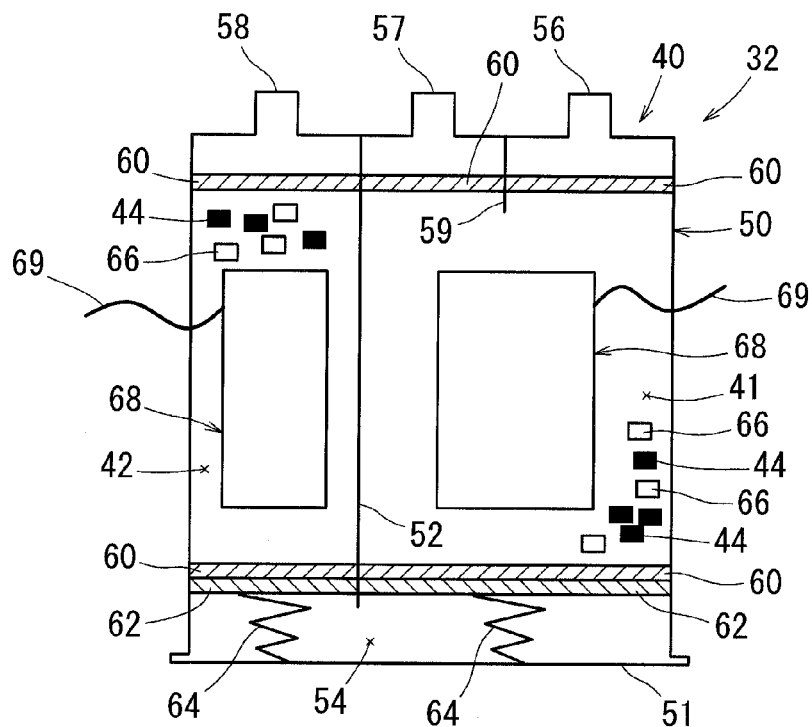
FIG. 2 is a schematic sectional view of the fuel vapor processing apparatus.

As shown in FIG. 2, the fuel vapor processing apparatus 32 includes the case 40 that may be made of resin. The case 40 may include a tubular case body 50 having an upper end and a lower end, and a closure member 51 for closing a lower opening formed at the lower end of the case body 50. The internal space of the case body 50 may be divided into a left chamber and a right chamber by a partitioning wall 52. The left chamber and the right chamber may communicate with each other via a communication passage 54 that is defined within the lower end portion of the case body 50. With this arrangement, a substantially U-shaped gas flow passage is defined in the case 40.

A tank port (also called "charge port") 56 and a purge port 57 each communicating with the right chamber of the case body 50, and an atmospheric port 58 communicating with the left chamber are defined in the upper end portion of the case body 50. In the fuel vapor processing system 30 shown in FIG. 1, the tank port 56 is connected to the fuel vapor passage 34, and the purge port 57 is connected to the purge passage 36. In FIG. 1, the tank port 56 and the charge port 57 are arranged in an order reversed from that shown in FIG. 2 for the purpose of illustration. The atmospheric port 58 may be opened into the atmosphere. The upper portion of the right chamber may be further divided into a left portion and a right portion by a partition wall 59. The left portion and the right portion with respect to the partition wall 59 may communicate with the purge port 57 and the tank port 56, respectively.

Filters 60 may be disposed at the left and right portions of the upper portion of the right chamber divided by the partition wall 59, the lower end portion of the right chamber, and the upper and lower end portions of the left chamber, respectively, so as to extend across these portions. The filters 60 may be made, for example, of non-woven resin fabric, urethane foam, etc. On the lower side of each of the filters 60 disposed within the lower end portions of the right and left chambers, a perforated plate 62 may be positioned to be overlapped with the corresponding filter 60. A spring 64 that may be a coil spring is interposed between each of the perforated plates 62 and the upper surface of the closure member 51 to bias the corresponding perforated plate 62 upward. A first adsorption chamber 41 may be defined between the filter 60 disposed at the lower end portion of the right chamber and the filters 60 disposed at the upper end portion of the right chamber. A second adsorption chamber 42 may be defined between the filter 60 disposed at the lower end portion of the left chamber and the filter 60 disposed at the upper end portion of the same. In this embodiment, each of the first and second adsorption chambers 41 and 42 may be configured to have a quadrangular prism shape having a longitudinal axis in the vertical direction, a width in the left and right direction, and a length in the forward and rearward direction (i.e., the direction perpendicular to the plane of the sheet of FIG. 2). The width may be larger than the length.

A mixture of activated carbon 44 in a form of granules and a latent heat storage material 66 also in a form of granules may be filled within each of the first and second adsorption chambers 41 and 42. The activated carbon 44 may adsorb fuel vapor and may allow desorption of fuel vapor. The activated carbon 44 may be crushed activated carbon or granulated activated carbon formed by a granulation process of a mixture of granular or powder activated carbon and a binder. The activated carbon 44 may be replaced with any other granular adsorption material that can adsorb fuel vapor and allow desorption of fuel vapor. In this specification, the term "granular activated carbon" is used to mean activated carbon formed of activated carbon granules with a volume mean diameter enabling the activated carbon granules to be filled within an adsorption chamber while allowing formation of suitable gaps for the flow of air between the activated carbon granules.

The granular latent heat storage material 66 may store latent heat that can serve to inhibit change of temperature of the activated carbon 44 as will be explained later. The granular latent heat storage material 66 may be a microcapsule-type heat storage material or a granulated heat storage material. The microcapsule-type heat storage material may be formed of microcapsules each sealingly containing a phase-change material that can absorb latent heat and can release the absorbed or stored latent heat according to change of temperature. The granulated heat storage material may be formed of pellets molded by a granulation process of a mixture of microcapsules each sealingly containing a phase-change material, and a binder resin. As the microcapsule-type heat storage material, a heat storage material disclosed in JP-A-2006-063327 or that disclosed in JP-A-2003-311118 may be used. In this specification, the term "granular heat storage material" is used to mean a heat storage material formed of heat storage material granules with a volume mean diameter enabling the heat storage material granules to be filled within an adsorption chamber while allowing formation of suitable gaps for the flow of air between the heat storage material granules.

An electric heater 68 (hereinafter simply called a "heater 68") may be located centrally of each of the first and second adsorption chambers 41 and 42. The heater 68 of each of the first and second adsorption chambers 41 and 42 may have a rectangular flat shape with a relatively thin thickness and may be a rectangular plate, sheet or film. The lengthwise direction of the heater 68 may be oriented in a direction of flow of air or fuel vapor containing gas (vertical direction in this embodiment) flowing through the corresponding one of the first and second adsorption chambers 41 and 42. The widthwise direction of the heater 68 may be oriented in the widthwise direction (the left and right direction) of the corresponding one of the first and second adsorption chambers 41 and 42. The thickness direction of the heater 68 may be oriented in the lengthwise direction (the direction perpendicular to the plane of the sheet of FIG. 2) of the corresponding one of the first and second adsorption chambers 41 and 42. The electric heater 68 may be embedded entirely into the mixture of the activated carbon 44 and the latent heat storage material 66 of the corresponding one of the first and second adsorption chambers 41 and 42. The ECU 25 (see FIG. 1) may control the operation of the heaters 68 of the first and second adsorption chambers 41 and 42. In other words, the electric power is supplied to the heaters 68 under the control of the ECU 25. In FIG. 2, reference numeral 69 denotes a lead wire extending from each heater 68.

The operation of the fuel vapor processing apparatus 30 incorporating the fuel vapor processing apparatus 32 will now be described.

Adsorption Process

During an adsorption process, the engine 12 may be in a state of being stopped and the purge valve 38 may be in a state of being closed. In this state, a gas containing fuel vapor generated within the fuel tank 14 (hereinafter simply called "fuel vapor containing gas") may be introduced into the first adsorption chamber 41 via the fuel vapor passage 34, so that the fuel vapor may be adsorbed by the activated carbon 44 filled within the first adsorption chamber 41. If a part of the fuel vapor could not be adsorbed by the activated carbon 44 of the first adsorption chamber 41, such a part of the fuel vapor may be introduced into the second adsorption chamber 42 via the communication passage 54 so as to be adsorbed by the adsorption material 44 of the second adsorption chamber 42. Then, a gas almost containing only air may be discharged from inside of the case 40 into the atmosphere. The temperature of each activated carbon 44 may be increased by an exothermal reaction that may occur with the adsorption operation. However, such an increase of temperature of the activated carbon 44 may be inhibited by latent heat (melting heat) of the latent heat storage material 66 mixed therewith. Therefore, it is possible to inhibit degradation in the adsorption ability of each activated carbon 44.

Purge Process

During a purge process performed when the engine 12 is being operated, the purge valve 38 may be opened (switched ON), so that the negative pressure of intake air supplied to the engine 12 is applied to inside of the case 40 of the fuel vapor processing apparatus 32 via the purge passage 36. In conjunction with this, atmospheric air (fresh air) may be introduced into the second adsorption chamber 42 via the atmospheric port 58 to desorb fuel vapor from the activated carbon 44 of the second adsorption chamber 42. The atmospheric air containing the desorbed fuel vapor may then be introduced into the first adsorption chamber 41 to desorb fuel vapor also from the activated carbon 44 of the first adsorption chamber 41. The atmospheric air containing the fuel vapor desorbed from the activated carbons 44 of the first and second adsorption chambers 41 and 42 is thereafter purged into the intake air passage 27 via the purge passage 36.

At the beginning of the purge process, the heaters 68 are not electrically energized. Therefore, reduction in temperature of each activated carbon 44 due to an endothermic reaction occurring with the adsorption operation may be inhibited by the latent heat (solidification heat) of the latent heat storage material 66 mixed with the activated carbon 44. Therefore, it is possible to inhibit degradation in the desorption ability of the activated carbons 44. The function of inhibiting reduction in temperature of the activated carbon 44 may be lost after the latent heat have been discharged from the corresponding latent heat storage material 68. Therefore, the ECU 25 may operate each of the heaters 68 or control to supply electric power to each of the heaters 68 for heating the activated carbon 44 at the same time or immediately before or after the latent heat is completely released from the latent heat storage material 66 mixed therewith. Hence, it is possible to improve the desorption ability of the activated carbons 44. After the fuel vapor has been completely desorbed from the activated carbons 44, the purge valve 38 may be closed (switched off) and the operations of the heaters 68 may be stopped (i.e., the heaters 68 are switched off).

An example of a control of the heaters 68 performed by the ECU 25 will now be described with reference to FIG. 3 that shows a time chart of operations of the purge valve 38 and one of the heaters 68 during the purge process. Because, the operations of the heaters 68 performed under the control of the ECU 35 are substantially the same, the operation of one of the heaters 68 of the first and second adsorption chambers 41 and 42 will be described in relation to the activated carbon 44 and the latent heat storage material 66 of the corresponding adsorption chamber.

Figure 3:
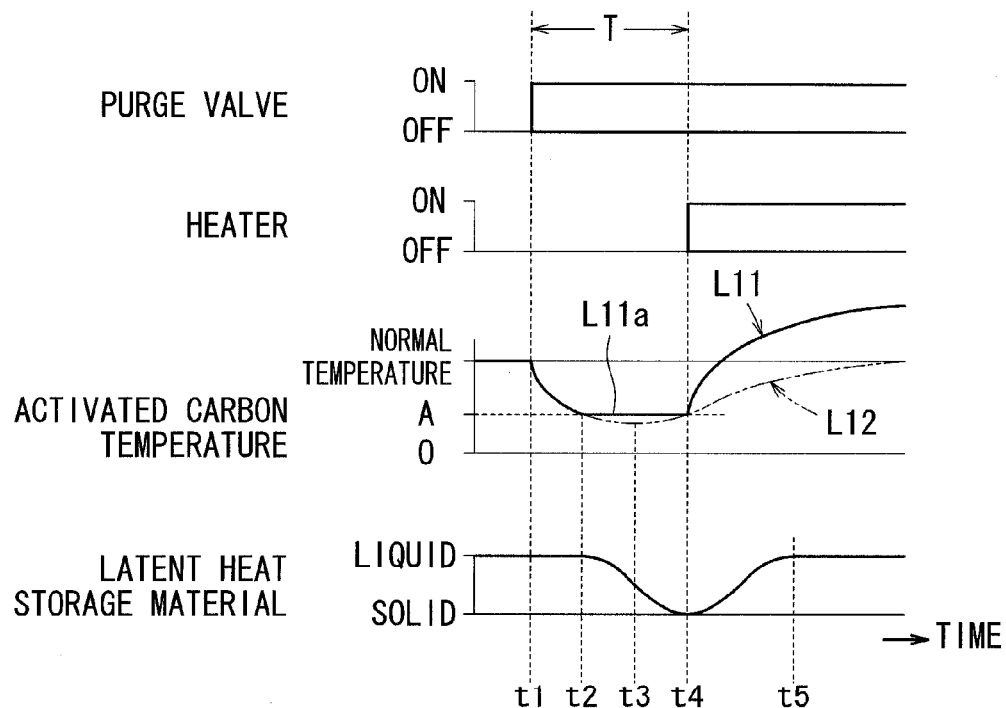
FIG. 3 is timing charts illustrating operations of a purge valve and a heater during a purge operation of the fuel vapor processing apparatus.

In FIG. 3, an abscissa shows a time, and ordinates show, in the order of top-to-bottom, a change in mode of operation (ON and OFF) of the purge valve 38, a change in mode of operation (ON or OFF) of the heater 68, a change in temperature of activated carbon 44, a change in phase of the latent heat storage material 66 (more specifically, the phase-change material contained therein). The engine 12 may be started before time t1. However, before time t1, no purge operation is performed, and therefore, the purge valve 38 is switched off (closed) and the heater 68 is switched off (with no supply of electric power). In addition, the temperature of the activated carbon 44 may be kept at a normal temperature before time t1, and the latent heat storage material 66 (more specifically, their phase-change material) may be kept in a liquid phase. A characteristic line L11 indicates the change in temperature of the activated carbon 44 of the present embodiment. A characteristic line L12 indicates the change in temperature of a comparative example in which the activated carbon 44 same as that of the present embodiment is used but no latent heat storage material 66 and no electric heater 68 are provided.

The purge operation may be started when the ECU 26 switches on the purge valve 38 to open the same. As the fuel vapor is desorbed from the activated carbon 44, the temperature of the activated carbons may be gradually lowered. When the temperature of the activated carbon 44 has been lowered to temperature A that may be a solidification temperature of the latent heat storage material 66 (more specifically, the phase-change material), the reduction in temperature of the activated carbon 44 may be inhibited by the latent heat (solidification heat) of the latent heat storage material 66, so that the temperature of the activated carbon 44 may be held at a certain temperature (see a part L11a of the characteristic line L11). Therefore, it may be possible to inhibit reduction in the desorption ability of the activated carbon 44. In conjunction with this, the latent heat storage material 66 may be gradually solidified. This condition may continue until time t4 when the latent heat has been completely released from the latent heat storage material 66.

Time t1 is the time when time T has elapsed after starting the process for desorption of fuel vapor, i.e., after opening the purge valve 38. Therefore, the time T is a period of time that is necessary for completing release of the latent heat from the latent heat storage material 66 after starting the desorption process. The time T can be determined by experiments, calculations, etc. and may be stored in the ECU 25. The latent heat storage material 66 may be completely solidified at time t4.

At the time t4, the ECU 25 may determine a time for operation of the heater 68 based on the time T and may then switch on the heater 68. Therefore, the temperature of the activated carbon 44 may be gradually increased (see the characteristic line L11) as the heater 68 heats the activated carbon 44. Therefore, it is possible to improve the desorption ability of the activated carbon 44. In conjunction with this, the latent heat storage material 68 may be gradually liquefied and may be completely liquefied at time t5. The ECU 25 may switch off the purge valve 38 and the heaters 68 after fuel vapor has been completely desorbed from the activated carbons 44.

In contrast, in the case of the comparative example incorporating no heat storage materials and no heaters, the temperature of the activated carbon 44 may decrease even after passing the time t2 and may reach the lowest value at time t3. After the time t3, the temperature of the activated carbon 44 may increase to be closer to the normal temperature. This may be caused due to the temperature of the air flowing through the adsorption chamber and due to the influence of the atmospheric temperature externally of the fuel vapor processing apparatus 32. The activated carbon 44 may be kept substantially at the normal temperature after reaching it.

According to the fuel vapor processing apparatus 32 described above, it is possible to improve the desorption abilities of the activated carbons 44 by the heat of the heaters 68 during the desorption process. During the time T when no electric power is supplied to the heaters 68 (i.e., when the heaters 68 are not operated or electrically energized), reduction in temperature of the activated carbons 44 caused by the evaporation latent heat of the fuel vapor may be inhibited by the latent heat of the latent heat storage materials 66. Therefore, it is possible to inhibit reduction in the desorption abilities of the activated carbons 44. Hence, the time required for the desorption process can be minimized and it is possible to reduce the power consumption of the heaters 68.

In addition, the ECU 25 may control such that each of the heaters 68 operates after the latent heat storage material 66 has started to release latent heat.

The ECU 25 may determine the time for operating each of the heaters 68 based on the time T elapsed after starting desorption of the fuel vapor. Because the time T is determined to be the time that is necessary for completion of release of the latent heat from the latent heat storage material 66 after starting the desorption process, each of the heater 68 can be operated at the same time the latent heat have been completely released from the latent heat storage material 66 while the latent heat can be effectively used. Other than this determination, the time T may be suitable determined. For example, the time T may be determined to be a total of a predetermined time and the time that is necessary for completion of release of the latent heat from the latent heat storage material 66 after starting the desorption process. With this determination, it is possible to operate each of the heaters 68 at the predetermined time after completion of release of the latent heat of the latent heat storage material 66. Alternatively, the time T may be determined to be a time deducted by a predetermined time from the time that is necessary for completion of release of the latent heat from the latent heat storage material 66 after starting the desorption process. With this determination, it is possible to operate each of the heaters 68 at the predetermined time before completion of release of the latent heat of the latent heat storage material 66.

Further, in the present embodiment, the latent heat storage material 66 is mixed with the activated carbon 44 within each of the first and second adsorption chambers 41 and 42. Therefore, the latent heat storage material 66 may be dispersedly distributed in the activated carbon 44.

(Second Embodiment)

A second embodiment will now be described with reference to FIGS. 4 to 6. The second embodiment is a modification of the first embodiment. Therefore, in FIGS. 4 to 6, like members are given the same reference numerals as the first embodiment and the description of these members will not be repeated.

Figure 4:
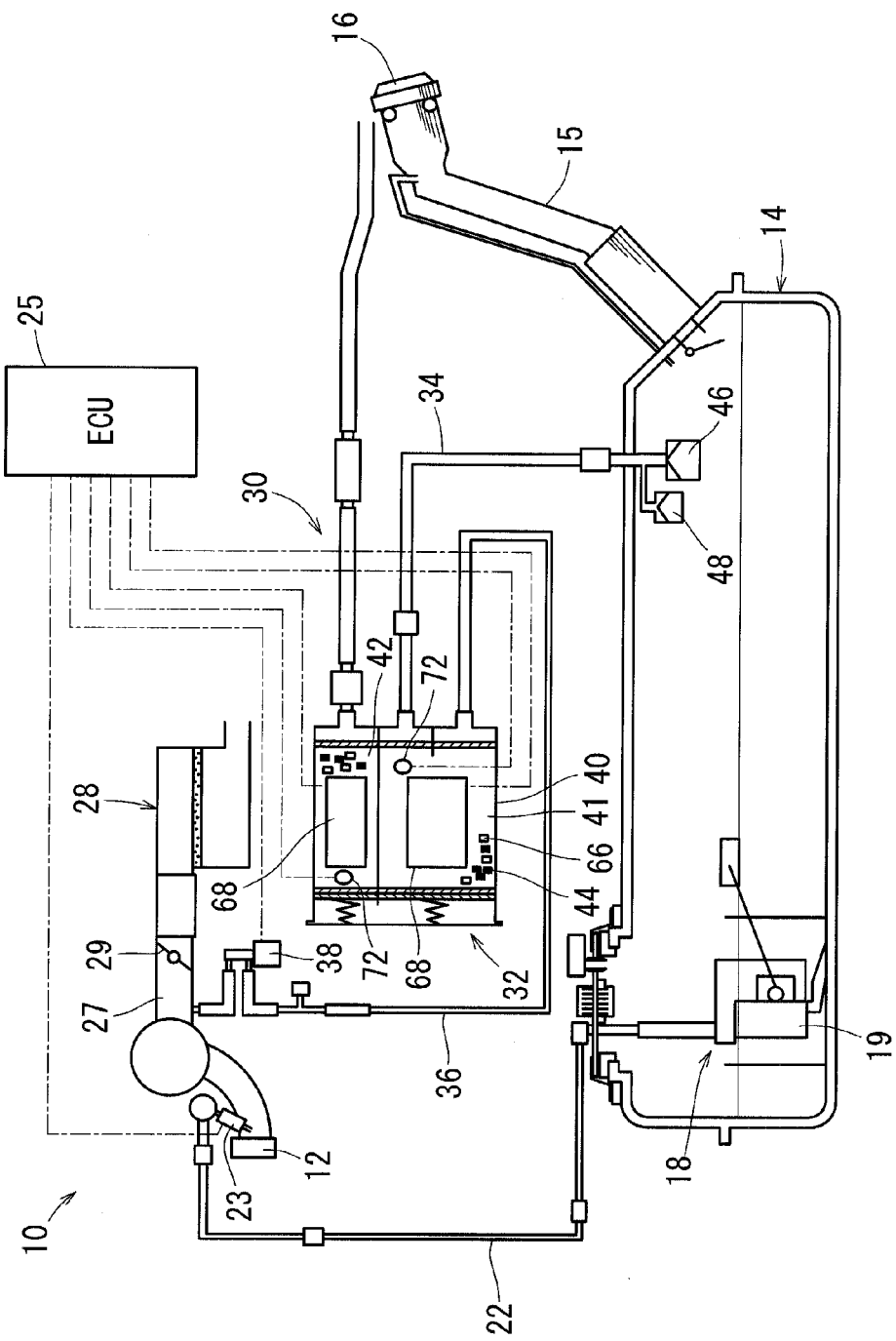
FIG. 4 is a schematic view of a vehicle engine system incorporating a fuel vapor processing apparatus according to a second embodiment.

As shown in FIG. 4, according to the second embodiment, a temperature sensor 72 for detecting the temperature of the activated carbon 44 is disposed within each of the first and second adsorption chambers 41 and 42 of the fuel vapor processing apparatus 32. More specifically, the temperature sensor 72 of the first adsorption chamber 41 is located substantially centrally of an end portion on the side of the tank port 56 (see FIG. 2) of the first adsorption chamber 41. The temperature sensor 72 of the second adsorption chamber 42 is located substantially centrally of an end portion on the side of the communication passage 54 (see FIG. 2) of the second adsorption chamber 42. The ECU 25 may receive the detection signal from each of the temperature sensors 72 for determining the times for operating the heater 68 based on the temperature of the activated carbon 44 of the corresponding adsorption chamber.

An example of a control performed by the ECU 25 for controlling the operation of the heater 68 will now be described with reference to FIG. 5. As described previously, the operations of the heaters 68 performed under the control of the ECU 35 are substantially the same, and therefore, the operation of one of the heaters 68 of the first and second adsorption chambers 41 and 42 will be described. In FIG. 5, an abscissa shows a time, and ordinates show, in the order of top-to-bottom, a change in mode of operation (ON or OFF) of the heater 68 and a change in temperature of activated carbon 44. In particular, FIG. 5 shows a change of temperature of the activated carbon 44 from starting the purge operation until the heater 68 is operated. Times t1, t2 and t4 are the same as those in the first embodiment (see FIG. 3). In addition, it is assumed that the temperature sensors 72 operate in the same manner within the first and second adsorption chambers 41 and 42.

Figure 5:
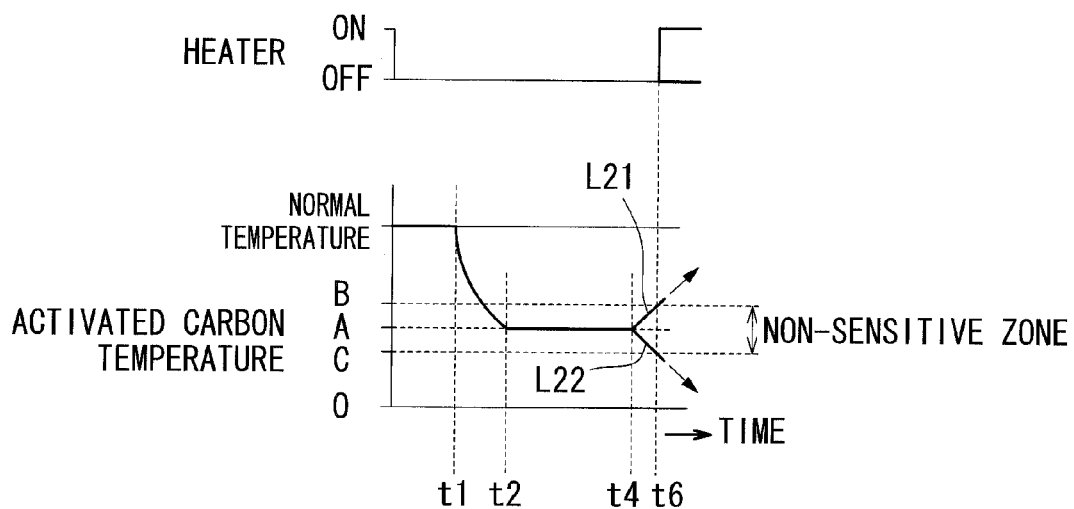
FIG. 5 is a timing chart illustrating operations of a heater during a purge operation of the fuel vapor processing apparatus.
Figure 6:
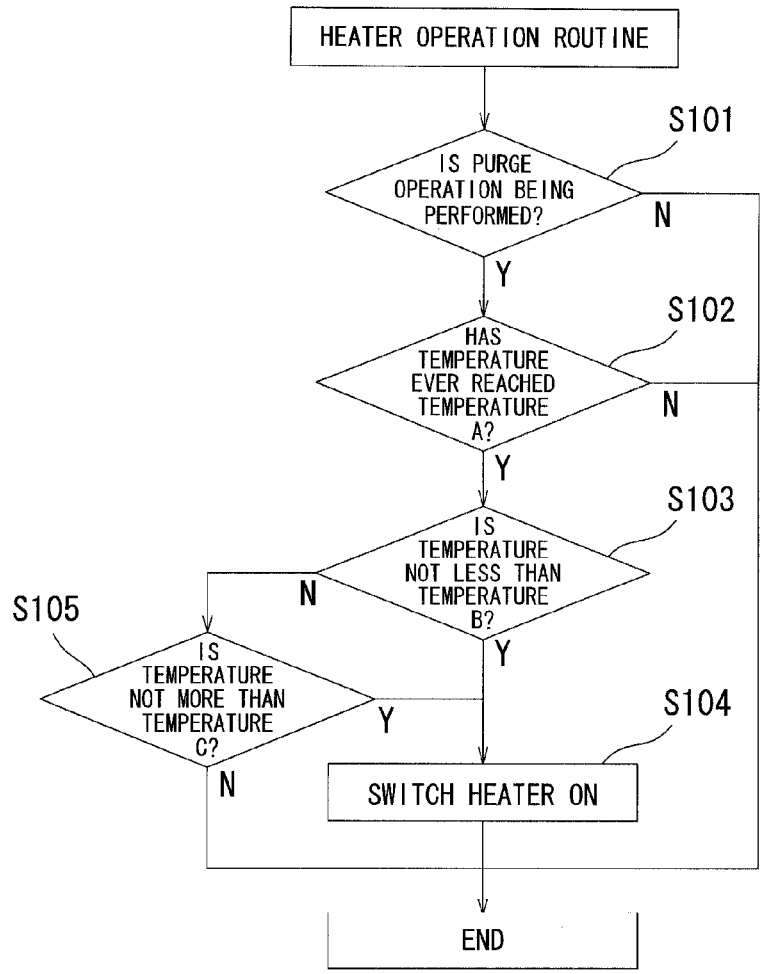
FIG. 6 is a flowchart showing a heater operation routine executed for operating the heater.

As shown in FIG. 5, if the heater 68 is not switched on after completion of release of latent heat from the latent heat storage material 66 at time t4, the temperature of the activated carbon 44 may increase after time t4 to exceed a solidification temperature A of the latent heat storage material 66 (see a characteristic line L21 in FIG. 5) due to the influence of the temperature of air flowing through the adsorption chambers 41 and 42 and/or the external atmospheric temperature. This may occur in the case that the amount of fuel vapor remaining at the activated carbon 44 is relatively small after time t4. However, in the case that the amount of fuel vapor remained at the activated carbon 44 is relatively large, the temperature of the activated carbon 44 may decrease to become lower than the solidification temperature A (see a characteristic line L22 in FIG. 5) because of continued desorption of fuel vapor.

For the above reason, in this embodiment, a non-sensitive zone for not switching the heaters 68 on is set between a temperature B that is lower than the solidification temperature A by a first predetermined value and a temperature C that is higher than the solidification temperature A by a second predetermined value that may be the same as the first predetermined value. Therefore, the ECU 25 may control to operate the heater 68 at time t6 when the temperature of the activated carbon 44 become higher than the temperature B or lower than the temperature C.

Next, the operation routine of the heater 68 executed by the ECU 25 for operating the heater 68 will be described with reference to FIG. 6. This operation routine may be repeatedly executed at predetermined time intervals for each of the heaters 68. In an initial state, the heater 68 is being switched off. First, it is determined whether a purge operation is being performed (i.e., the purge valve 38 is being switched on (opened)) in step S101. If the determination in step S101 is NO, the operation routine is finished.

In the determination in step S101 is YES, the routine proceeds to step S102, in which determination is made as to whether the temperature of the activated carbon 44 has ever reached the solidification temperature A. If the temperature A has never been reached, the routine is finished. If the temperature A has ever been reached, the routine proceeds to step S103, in which determination is made as to whether the temperature of the activated carbon 44 is not less than the temperature B. If the activated carbon temperature is not less than the temperature B, the routine proceeds to step S104, in which the heater 68 is switched on, and the routine is then finished. If the activated carbon temperature is less than the temperature B, the routine proceeds from step S103 to step S105, in which determination is made as to whether the temperature of the activated carbon 44 is not more than the temperature C. If the activated carbon temperature is not more than the temperature C, the routine proceeds to step S104, in which the heater 68 is switched on, and the routine is then finished. If the activated carbon temperature is more than the temperature C in step S105, the routine is finished.

In this way, according to the second embodiment, the ECU 25 determines the time when each of the heaters 68 is switched on based on the temperature of the activated carbon 44. Therefore, the ECU can accurately determine the completion of release of latent heat from the latent heat storage materials 66 and can operate the heaters 68 reliably after the release of latent heat from the latent heat storage materials 66. Hence, it is possible to effectively use the latent heat of the latent heat storage materials 66. The temperature sensors 72 within the first and second adsorption chambers 41 and 42 may operate in different manners from each other.

(Third Embodiment)

A third embodiment will now be described with reference to FIGS. 7 to 10. Also, the third embodiment is a modification of the first embodiment. Therefore, in FIGS. 7 to 10, like members are given the same reference numerals as the first embodiment and the description of these members will not be repeated.

Figure 7:
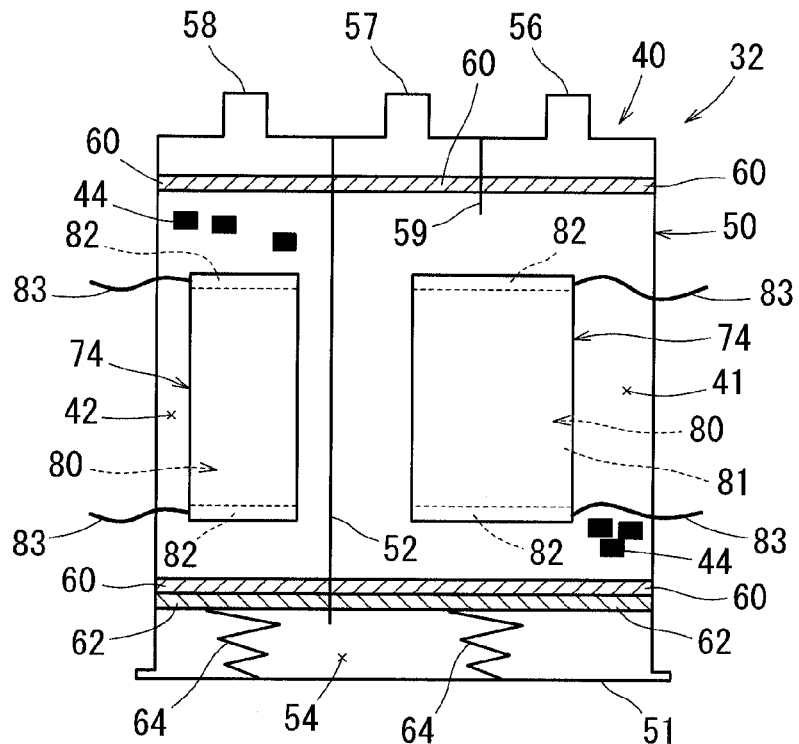
FIG. 7 is a schematic sectional view similar to FIG. 2 but showing a fuel vapor processing apparatus according to a third embodiment.

As shown in FIG. 7, the third embodiment is different from the fuel vapor processing apparatus 32 of first embodiment in that the latent heat storing materials 66 filled into the first and second adsorption chambers 41 and 42 (see FIG. 2) are omitted. Instead, an electric heater 74 having a latent heat storing material integrated therewith is used in place of the heater 68 for each of the first and second adsorption chambers 41 and 42. Also, each of the heaters 74 may be located centrally of the corresponding adsorption chamber.

Figure 8:
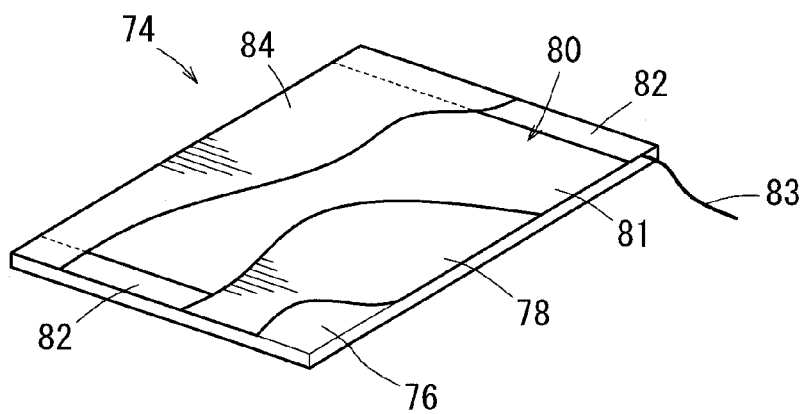
FIG. 8 is a perspective view of a heater with a part broken way.
Figure 9:
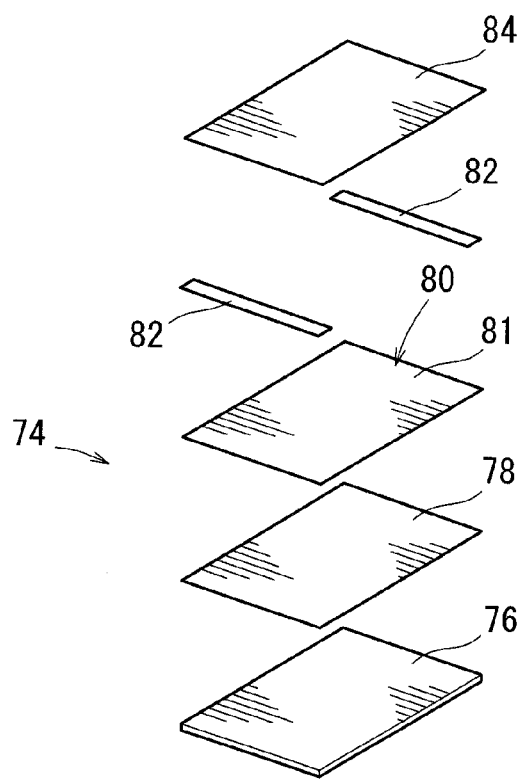
FIG. 9 is an exploded perspective view of the heater.

The construction of the heaters 74 will now be described. Because the heater 74 of the first adsorption chamber 41 and the heater 74 of the second adsorption chamber 42 are substantially the same except for the size, the construction of one of the heaters 74 will be described. As shown in FIG. 8, similar to the heater 68 of the first embodiment, the heater 74 may have a rectangular flat shape with a relatively thin thickness and may be a rectangular plate, sheet or film. The heater 74 includes a base plate 76, a first insulation layer 78, a heat generation layer, an electrode layer 82 and a second insulation layer 84 (see FIG. 9). The base plate 76 may have a rectangular flat shape and may be made of material having high heat conductivity, such as aluminum alloy that may have high heat conductivity than that of the activated carbon 44. The first insulation layer 78 may be laid over the entire surface of the base plate 76. For example, the first insulation layer 78 may be an electrical insulation film formed by printing with heat-curable or photo-curable insulation ink, such as that made of polyimide resin.

The heat generation layer 80 may be laid over the entire surface of the first insulation layer 78. For example, the heat generation layer 80 may be formed by printing with heat-curable heat generation ink, such as that made of electrically conductive resin containing carbon, so that the heat generation layer 80 can generate heat when a current is applied (i.e., when electrically energized). A latent heat generation material 81 in a form of powder may be mixed with the heat generation ink prior to printing, so that the heat generation layer 80 may contain the latent heat generation material 81.

The electrode layer 82 may be in a form of two strips that are positioned at opposite end portions in the longitudinal direction of the heat generation layer 80 and extend in the widthwise direction of the same. The two strips of the electrode layer 82 may be formed by printing with heat curable electrode ink, such as that made of electrically conductive resin containing silver, so that the electrode layer 82 has an electrical conductively. A lead wire 83 may be attached to one end of each of the strips of the electrode layer 82. The second insulation layer 84 may be laid over the entire surface of the electrode layer 82 and a portion of the heat generation layer 80 (i.e., a portion other than portions on which the electrode layer 82 are formed). Similar to the first insulation layer 78, the second insulation layer 84 may be formed by printing with heat-curable or photo-curable insulation ink, such as that made of polyimide resin.

An example of a method of manufacturing the heater 74 will now be described. First, the insulation ink for the first insulation layer 78 may be printed on the base plate 76. After the insulation ink has been cured to form the first insulation layer 78, the heat generation ink for the heat generation layer 80 may be printed on the first insulation layer 78. After the heat generation ink has been cured to form the heat generation layer 80, the electrode ink for the electrode layer 82 may be printed on the opposite end portions of the heat generation layer 80. After the electrode ink has been cured to form the electrode layer 82 in a form of strips, the lead wire 83 may be attached to one end of each of the strips of the electrode layer 82. Thereafter, the insulation ink for the second insulation layer 84 may be printed on the electrode layer 82 and the heat generation layer 80 (other than portions on which the electrode layer 82 are formed). Finally, the insulation ink may be cured to form the second insulation layer 84, so that the heater 74 may be completed.

The printing steps of the inks for forming the heat generation layer 80, the first and second insulation layers 78 and 84 and the electrode layer 82 may be performed by using a screen printing technique. In this connection, particles of the powder of the latent heat storing material 81 contained in the heat generation layer 80 may have such a volume mean diameter that enables the latent heat storing material 81 to pass through meshes of a screen used in the screen printing technique. For example, the volume mean diameter of the latent heat storing material 81 may be less than 500 μm that may be larger than an available smallest volume mean diameter. In this specification, the term "powder" used in connection with the latent heat storing material 81 may mean particles having an appropriate volume mean diameter chosen to prevent the particles from dropping downward through gaps formed between granules of the activated carbon 44 by the gravity force and to prevent the particles from being carried by the flow of air and flown to the outside. By mixing the powder of the latent heat storing material 81 with the heat generation ink and printing the mixed ink to form the heat generation layer 80, it is possible to reliably hold the powder of the latent heat storage material 81 within the heat generation layer 80.

According to the third embodiment, the heater 74 includes the heat generation layer 80 that can generate heat when a current is applied, and the heat generation layer 80 is formed by printing and curing the heat generation ink that contains the latent heat storing material 81. Therefore, the latent heat storing material 81 can be easily integrally held within the heat generation layer 80. In addition, the heat generation layer 80 can be easily formed by printing and curing the heat generation ink. Although the heat generation ink for the heat generation layer 80 is printed by using a screen printing technique, it may be possible to use the other printing technique, such as an ink jet printing technique. In such a case, the volume mean diameter of the latent heat storing material 81 may be chosen to be suitable for the ink jet printing technique. Further, the heat generation ink may be applied by using a technique other than a printing technique. For example, the heat generation ink may be applied by a coating technique using a spray gun, a brush, a roller, etc. Also in this case, the volume mean diameter of the latent heat storing material 81 may be chosen to be suitable for the coating technique used.

In the case that the heat generation ink is applied by using the printing technique or the coating technique, the latent heat storing material 81 may not be necessary to be in a form of powder but may be in a form of granules.

At least one of the first and second insulation layers 78 and 84 and the electrode layer 82 of the heater 74 may be formed by using a printing technique other than a screen printing technique or by using a coating technique. In addition, at lest one of the first and second insulation layers 78 and 84 may be in a form of a solid insulation film. Similarly, at least one of the strips of the electrode layer 82 may be in a form of a solid electrode sheet. Further, the heaters 68 of the first and second embodiments can be replaced with the heaters 74 of the third embodiment.

Figure 10:
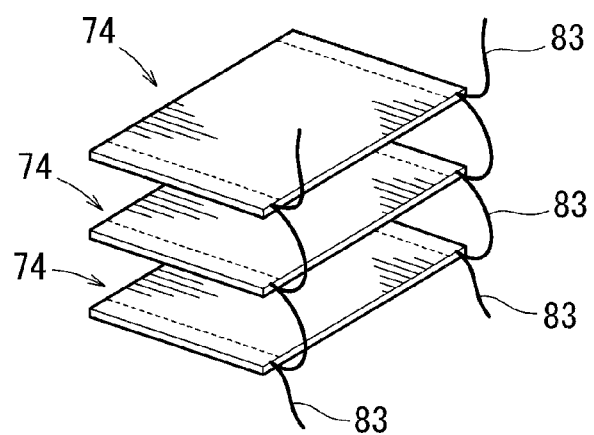
FIG. 10 is an example of arrangement of a plurality of heaters.

Each of the first and second adsorption chambers 41 and 42 may include a plurality of heaters 74. In such a case, the heaters 74 may be arranged as shown in FIG. 10. In FIG. 10, a plurality of heaters 74 (three heaters 74 are provided in this example) may be positioned in parallel to each other and may be spaced from each other by a predetermined distance. The lead lines 83 of the heaters 74 on their opposite sides may be connected in parallel to each other. The heaters 68 of the first and second embodiments can be replaced with the heaters 74 arranged as shown in FIG. 10.

(Fourth Embodiment)

A fourth embodiment will be described with reference to FIG. 11. This embodiment is a modification of the third embodiment. Therefore, in FIG. 11, like members are given the same reference numerals as the third embodiment, and the description of these members will not be repeated.

Figure 11:
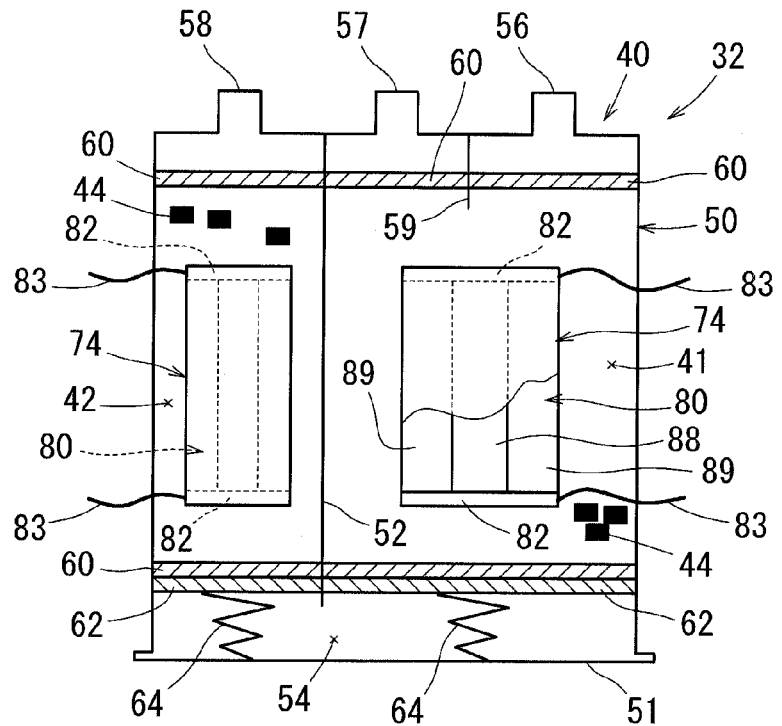
FIG. 11 is a schematic sectional view similar to FIG. 2 but showing a fuel vapor processing apparatus according to a fourth embodiment.

As shown in FIG. 11, in the fuel vapor processing apparatus 32 of this embodiment, the heat generation layer 80 of each of the heaters 74 are divided into three sections including a central section 88 and left and right sections 89 in the widthwise direction (left and right direction). The distribution density of the latent heat storing material (not shown) contained in the central section 88 is set to be higher than that of the latent heat storing material contained in the left and right sections 89.

In general, in each of the first and second adsorption chambers 41 and 42, there is a tendency that a larger amount of heat may be accumulated in the central region as viewed in cross section (perpendicular to the direction of flow of gas) than in the outer peripheral region. For example, during the purge process (i.e., the desorption process), a portion of the activated carbon 44 located in the central region may be less affected by the external temperature than the other portion of the activated carbon 44 located in the outer peripheral region. Therefore, reduction in temperature of the portion of the activated carbon 44 located in the central region may be less than that of the other portion of the activated carbon located in the outer peripheral region.

Figure 12:
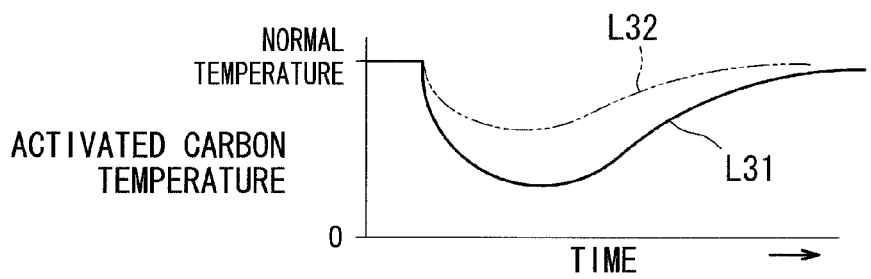
FIG. 12 is a graph showing characteristic lines indicating the relationship between a purge time and a temperature of activated carbon.

FIG. 12 is a graph showing a characteristic of temperature of the activated carbon in relation to the time during the purge operation. In FIG. 12, a characteristic line L31 shows a change in temperature of a portion of the activated carbon located in the central region of the first adsorption chamber 41 (or the second adsorption chamber 42), and a characteristic line L32 shows a change in temperature of the other portion of the activated carbon 44 located in the outer peripheral region. It may be understood from the characteristic lines L31 and L32 that reduction in temperature of the portion of the activated carbon 44 located in the central region is less than that of the other portion of the activated carbon located in the outer peripheral region.

As described previously, the heater 74 is located centrally of each of the first and second adsorption chambers 41 and 42

(see FIG. 11). Therefore, the central section 88 of the heat generation layer 80 of the heater 74 may be positioned within or proximal to the central region of each of the first and second adsorption chambers 41 and 42. The left and right sections 89 may be positioned within or proximal to the outer peripheral region. Therefore, the distribution density of the latent heat storage material of the heater 74 located in the central region may be higher than that of the latent heat storage material of the heater 74 located in the outer peripheral region.

According to the fourth embodiment, the distribution density of the latent heat storage material of the heater 74 located in the central region may be higher than that of the latent heat storage material of the heater 74 located in the outer peripheral region. Therefore, reduction in temperature of the activated carbon 44 located in the central region of each of the first and second adsorption chambers 41 and 42 can be effectively inhibited by the latent heat released from the latent heat storing material contained in the central section 88 of the heat generation layer 80.

The fourth embodiment may be modified such that the heat generation layer 80 of the heater 74 is divided into four or more sections in the left and right direction. In such a case, the distribution density of the latent heat storing material may be set such that it increases from the opposite end sections toward the central section in two or more steps or incrementally. Additionally or alternatively, the distribution density of the latent heat storing material in each of the divided sections may be suitably determined according to the arrangement of the heater 74 within each of the first and second adsorption chambers 41 and 42.

(Fifth Embodiment)

A fifth embodiment will now be described. Although not shown in the drawings, the fifth embodiment is a modification of the first embodiment and is different from the first embodiment in that the distribution density of the latent heat storing material 66 (see FIG. 2) is set such that it increases from the outer peripheral side as viewed in cross section (perpendicular to the direction of flow of gas) of each of the first and second adsorption chambers 41 and 42 toward the central side. Also with this arrangement, reduction in temperature of the activated carbon 44 located in the central region of each of the first and second adsorption chambers 41 and 42 can be effectively inhibited by the latent heat released from the latent heat storing material 66 located in the central region. The distribution density of the latent heat storing material 66 may be set such that it increases from the outer peripheral side toward the central side in two or more steps or incrementally.

(Sixth Embodiment)

A sixth embodiment will now be described. Although not shown in the drawings, the sixth embodiment is a modification of the first embodiment or the fifth embodiment and is different from the first embodiment or the fifth embodiment in that the granules of the latent heat storage material 66 are adhered to the granules of the activated carbon 44 by using an adhesive agent or by using a spraying or coating technique. In this case, the latent heat storage material 66 is not necessary to be in a form of granules but may be in a form of powder as long as the latent heat storage powder can be adhered to the activated carbon granules by using an adhesive agent or by using a spraying or coating technique.

The above embodiments may be modified in various ways. For example, although the fuel vapor processing apparatus 32 in each of the above embodiments has two adsorption chambers or the first and second adsorption chambers 41 and 42, the number of the adsorption chambers may be suitably determined. Thus, the fuel vapor processing apparatus 32 may have one or three or more adsorption chambers. In addition, the heater 68(74) of one of the first and second adsorption chambers 41 and 42 may be omitted. Further, the heaters 68(70) may be replaced with any other heating devices (other than electric heaters) that can heat the activated carbons 44. In addition, the heaters or the heating devices may not be necessary to be located centrally of the first and second adsorption chambers 41 and 42 but may be attached to the inner circumferential wall of each of the first and second adsorption chambers.

What is claimed is:

1. A fuel vapor processing apparatus comprising:
   a case;
   an adsorption material located within the case,
   wherein the adsorption material can adsorb fuel vapor introduced in the case, and fuel vapor adsorbed by the adsorption material can be purged into an engine by air flowing through the case;
   a heater configured to heat the adsorption material;
   a latent heat storage material;
   wherein the latent heat storage material releases latent heat to inhibit change of temperature of the adsorption material; and
   a heat control device configured to operate the heater after the latent heat storage material starts to release latent heat.

2. A fuel vapor processing apparatus comprising:
   a case;
   an adsorption material located within the case,
   wherein the adsorption material can adsorb fuel vapor introduced in the case, and fuel vapor adsorb by the absorption material can be desorbed from the adsorption material so as to be purged into an engine by air flowing through the case;
   a heater configured to heat the adsorption material; and
   a latent heat storage material;
   wherein the latent heat storage material releases latent heat to inhibit change of temperature of the adsorption material; and
   wherein the heater includes a heat generation element capable of generating heat when electrically energized, and the heat generation element is a film formed by curing a heat generation ink that contains the latent heat generation material.

3. The fuel vapor processing apparatus according to claim 1, wherein the heat control device determines a time for operating the heater based on the temperature of the adsorption material.

4. The fuel vapor processing apparatus according to claim 1, wherein the heat control device determines a time for operating the heater based on a time elapsed after starting desorption of fuel vapor from the adsorption material.

5. The fuel vapor processing apparatus according to claim 1, wherein the heat control device configured to operate the heater after the latent heat from the latent heat storage material is completely released.

6. The fuel vapor processing apparatus according to claim 2, wherein the heat generation ink is printed by using a screen printing technique.

7. The fuel vapor processing apparatus according to claim 2 wherein the latent heat storing material is in a form of granules having a volume average diameter of equal to or less than 500 μm.

8. The fuel vapor processing apparatus according to claim 2, wherein a distribution density of the latent heat storing material contained in the heat generation element located in a central region or proximal to the central region of the case as viewed in a cross section perpendicular to a direction of flow of gas through the case is higher than a distribution density of the latent heat storing material contained in the heat generation element located in the other region than the central region.

9. The fuel vapor processing apparatus according to claim 1, wherein a mixture of the latent heat storage material and the adsorption material is filled into the case.

10. The fuel vapor processing apparatus according to claim 1, wherein the latent heat storage material is adhered to the adsorption material.

11. The fuel vapor processing apparatus according to claim 9, wherein a distribution density of the latent heat storing material located in a central region or proximal to the central region of the case as viewed in a cross section perpendicular to a direction of flow of fuel vapor flowing through the case is higher than a distribution density of the latent heat storing material located in the other region than the central region.

12. The fuel vapor processing apparatus according to claim 10, wherein a distribution density of the latent heat storing material located in a central region or proximal to the central region of the case as viewed in a cross section perpendicular to a direction of flow of fuel vapor flowing through the case is higher than a distribution density of the latent heat storing material located in the other region than the central region.

* * * * *

UNITED STATES PATENT AND TRADEMARK OFFICE
CERTIFICATE OF CORRECTION

PATENT NO. : 8,920,545 B2  
APPLICATION NO. : 13/603737  
DATED : December 30, 2014  
INVENTOR(S) : Katsuhiko Makino It is certified that error appears in the above-identified patent and that said Letters Patent is hereby corrected as shown below:

In the Claims:

Claim 1, column 14, line 16:
"can be purged into" should read -- can be desorbed from the adsorption material so as to be purged into --.

Claim 2, column 14, line 30:
"adsorb" should read -- adsorbed --.

Signed and Sealed this  
Seventh Day of July, 2015

Michelle K. Lee  
*Director of the United States Patent and Trademark Office*